US011471720B2

(12) United States Patent
Kildegaard et al.

(10) Patent No.: US 11,471,720 B2
(45) Date of Patent: *Oct. 18, 2022

(54) PLAYGROUND

(71) Applicant: Kompan A/S, Odense SØ (DK)

(72) Inventors: Carsten Kildegaard, Odense (DK);
Sheila Rode Hansen, Kværndrup (DK);
Børge Danielsen, Ørbæk (DK); Søren Vangsgaard, Fredericia (DK); Peter Christian Løvfold Grønfeldt, Odense (DK)

(73) Assignee: Kompan A/S, Odense SØ (DK)

( * ) Notice: Subject to any disclaimer, the term of this patent is extended or adjusted under 35 U.S.C. 154(b) by 12 days.

This patent is subject to a terminal disclaimer.

(21) Appl. No.: 16/733,699

(22) Filed: Jan. 3, 2020

(65) Prior Publication Data

US 2020/0139183 A1 May 7, 2020

Related U.S. Application Data

(63) Continuation of application No. 15/127,723, filed as application No. PCT/EP2015/055892 on Mar. 20, 2015, now Pat. No. 10,525,298.

(30) Foreign Application Priority Data

Mar. 21, 2014 (EP) .................................... 14161097

(51) Int. Cl.
*A63B 9/00* (2006.01)
*F16B 7/18* (2006.01)
(Continued)

(52) U.S. Cl.
CPC ................ *A63B 9/00* (2013.01); *A63B 17/04* (2013.01); *F16B 7/0453* (2013.01); *F16B 7/18* (2013.01);
(Continued)

(58) Field of Classification Search
CPC ........ A63B 2009/002; A63B 2009/006; A63B 2009/008; A63B 9/00; A63B 17/04;
(Continued)

(56) References Cited

U.S. PATENT DOCUMENTS 6,402,663 B1 * 6/2002 Popp .................. A63B 69/0048
482/35
2004/0136783 A1 7/2004 Tuc
(Continued)

FOREIGN PATENT DOCUMENTS

EP 0 085 452 A2 8/1983
EP 0462039 A1 12/1991
(Continued)

OTHER PUBLICATIONS

Patent Translate Translation of EP0502266A1 Description (Year: 2021).*
(Continued)

*Primary Examiner* — Jennifer Robertson
(74) *Attorney, Agent, or Firm* — Bookoff McAndrews, PLLC

(57) ABSTRACT

The invention relates to a playground comprising a number of pillars of a circular cross sectional area, and a series of playground elements including floor panels and side panels, and a series of brackets for attachment of the playground elements to the pillars. The brackets comprise an element coupling portion adapted to be fastened to a playground element and a pillar coupling portion adapted to be fastened to a side portion of a pillar. Here, the pillar coupling portion comprising a contact face curved to lie against pillar and a boring for receiving a fastening member which is oriented such that the bracket when fastened to the pillar is attached by the fastening member inserted from the bracket and into the pillar in a radial direction of the pillar. The series of
(Continued)

brackets comprises brackets with element coupling portions adapted to be fastened to each of the playground elements in the series of playground elements, and all the brackets in the series comprise essentially identical pillar coupling portions such that all the brackets are adapted to be attached to the pillars in the same way. The invention also relates to a method of assembling such a playground. The series of playground elements may include floor panels, side panels, a series of bars of predefined diameters and chains.

19 Claims, 11 Drawing Sheets

(51) Int. Cl.
    *F16B 7/04*     (2006.01)
    *F16B 9/02*     (2006.01)
    *F16B 9/00*     (2006.01)
    *A63B 17/04*     (2006.01)

(52) U.S. Cl.
    CPC ............... *F16B 9/02* (2013.01); *F16B 9/05* (2018.08); *A63B 2009/002* (2013.01); *A63B 2009/006* (2013.01); *A63B 2208/12* (2013.01)

(58) Field of Classification Search
    CPC ............... A63B 2208/12; F16B 9/02; F16B 9/023–026; F16B 9/05–058; F16B 7/0453; F16B 7/18; A63G 31/00
    See application file for complete search history.

(56) References Cited

U.S. PATENT DOCUMENTS

2008/0051257 A1*   2/2008   Hamblin ............... A63B 17/02
                                                         482/35
2009/0131184 A1*   5/2009   Pizmony ................ A63B 9/00
                                                         472/106

FOREIGN PATENT DOCUMENTS

EP         0502266 A1 *   9/1992   ........... E04H 12/02
EP         1 145 741 A1    10/2001
EP         1398515 A2 *   3/2004   ............... F16B 7/18

OTHER PUBLICATIONS

International Search Report for PCT/EP2015/055892 dated Jul. 1, 2015.

* cited by examiner

PLAYGROUND

INCORPORATION BY REFERENCE TO ANY PRIORITY APPLICATIONS

This application is a continuation of U.S. patent application Ser. No. 15/127,723, filed Sep. 20, 2016, which is a U.S. National Phase application of PCT International Application Number PCT/EP2015/055892, filed on Mar. 20, 2015, designating the United States of America and published in the English language, which is an International Application of and claims the benefit of priority to European Patent Application No. 14161097.2, filed on Mar. 21, 2014. The disclosures of the above-referenced applications are hereby expressly incorporated by reference in their entireties.

BACKGROUND

Field

The present invention relates to a playground comprising a number of pillars, a series of playground elements including floor panels and side panels, and a series of brackets for attachment of the playground elements to the pillars. The invention further relates to a method of assembling or setting up such playground.

Description of the Related Art

Traditionally, playgrounds are designed and dimensioned to their specific location, primary target users such as pre-school children, children aged 6-9, teenagers or even adults, and potentially with a specific theme or purpose such as an educational theme, a historic theme or designed with a view to maximize for example the physical or creative activity for the users. Each playground therefore is designed and constructed with a specific number of slides attached to some platforms, a number of houses or pavilions etc., and where the pillars, bars, guard panels, floor elements, spacers, coverings etc. are then adapted from different standard components or specially manufactured for that specific playground.

In order to be able to create and market a large number of different playgrounds and cover the different customer needs, the playground manufacturers therefore traditionally need to have and maintain a catalogue comprising a very large number of different parts or components, which however makes the production more costly.

Also, already established playgrounds are often difficult and expensive to expand or modify, and may be too complex and expensive to adapt or change into being oriented towards another group of users. A further disadvantage is, that a relatively large number of different components and parts makes the building of a playground relatively complicated, work intensive and time consuming as the different components and elements are assembled by a correspondingly large number of different attachment means involving different brackets, clamping bolts, screws, flanges etc.

Different ways of fastening floor panels, guard panels and the like playground elements to load carrying pillars are known. In EP0085452 the playground elements are fastened to pillars made of wood by means of clamping bolts inserted in through going bores in the pillars and supporting elements on outer faces on both sides of the pillars. In EP0462039 the elements are fastened by means of clamping rings or collars bolted together around the pillar.

Such fastening means however disadvantageously are not well suited if more elements are to be attached to the same pillar at the same height without having to somehow specially adapt the attachment means and therefore do not promote later expansion or modification of the playground. Further, all these types of attachment means disadvantageously protrude from the pillar and therefore reduces the safety of the users playing or running around the playground.

SUMMARY

It is therefore an object of embodiments of the present invention to overcome or at least reduce some or all of the above described disadvantages of the known playground products by providing a playground which is modular and which has improved possibilities for expansion and modifications both during establishment and later.

It is a further object of embodiments of the invention to provide a playground which can be built from a reduced number of different components.

It is a yet further object of embodiments of the invention to provide a playground of elements which are simple and fast to assemble and with an improved safety for the user of the playground.

In accordance with the invention this is obtained by a playground comprising a number of pillars of a circular cross sectional area, a series of playground elements including floor panels and side panels, and a series of brackets for attachment of the playground elements to the pillars. All the brackets in the series of brackets comprise an element coupling portion adapted to be fastened to a playground element and a pillar coupling portion adapted to be fastened to a side portion of a pillar. The pillar coupling portion comprising a contact face curved to lie against the side portion of the pillar and a boring for receiving a fastening member to be inserted a distance into the pillar. The boring is oriented in a direction approximately perpendicular to the curved contact face such that the bracket when fastened to the pillar is attached by the fastening member inserted from the bracket and into the pillar in a radial direction of the pillar. The series of brackets comprises brackets with element coupling portions adapted to be fastened to each of the playground elements in the series of playground elements, and all the brackets in the series of brackets comprise essentially identical pillar coupling portions such that all the brackets are adapted to be attached to the pillars in the same way.

Hereby is obtained playground which can be constructed in part or completely as a modular playground. The playground can be built in an unlimited number of different ways and sizes by the use of the pillars as the load carrying structure onto which the different types and sizes of playground elements are attached as desired by means of the series of brackets. In this way the same playground elements and pillars can be used to create completely different playgrounds for example designed with a view to stimulate different ways of playing, or directed towards users of different ages, abilities, or interests. Because of the brackets being attached to only a side portion of the pillars, multiple brackets can be attached next to or close to each other enabling for example more floor elements to be placed in abutment forming an assembled larger floor or a bar to continue on the other side of a pillar in the same height. This can be realized with the same brackets without having to construct specially adapted brackets for the purpose. Hereby the number of different types of brackets needed to obtain this in principle unlimited freedom of combination is kept to a minimum which makes the manufacture of the playground less expensive. Also the assembly and building of the playground simplified greatly because of the reduced number of different parts to handle and mount.

The series of playground elements comprises the elements that are to be placed in between and carried by the pillars and forming the basic shapes of the modular playground. The series may be reduced to a relatively few different basic types of elements such as some or all of floor panels to be placed horizontally between the pillars, side panels to be placed vertically between the pillars, bars to be placed horizontally or at an angle between the pillars, and chains or ropes. Each type of basic playground element in the series of elements may then be manufactured in a prescribed number of shapes, sizes (area, lengths and diameters), materials, and colours and patterns. In addition to this series of playground elements, the playground may then be equipped with other types of playground components such as slides, swings, nets, tubes, turning wheels, ladders, roof elements, elements for decoration etc.

The pillar coupling portion of a bracket is adapted to be fastened to a side portion of a pillar by which is understood that the pillar coupling portion only extends over a part of the circumference of the pillar and is not clamped around the pillar.

Due to the attachment of the brackets by a fastening member inserted into the pillar, and as the brackets are attached to only a side portion of the pillar, multiple brackets can be attached to the same pillar in a side by side relationship or at essentially the same height of the pillar. This facilitates the modularity of the playground so that part of or the entire playground can be constructed and built by a limited number of different types and sizes of playground elements which are then assembled as desired. Further, the attachment of the brackets is advantageous by avoiding any protruding parts such other than the bracket itself only on the one side of the pillar. This is especially important in the context of playground equipment where the safety of the users is a key issue, and everything is done to prevent for example cloth getting caught somewhere during playing.

The pillar coupling portion may extend over a side portion of a certain angular width of the pillar such as for example 10-15 degrees, 25-30 degrees, 35-45 degrees, 55-60 degrees, 85-90 degrees, or 90-110 degrees. By angular width is here and in the following understood the angular extension of the portion as attached to a pillar as seen in a top view (i.e. in a plane perpendicular to a central axis of the pillar) and as measured from the centre of the pillar. This is also illustrated in FIGS. 3, 19, and 21. The use of brackets with an angular width of approximately 30, 45, 60 or 90 degrees is advantageous in facilitating the modularity of the playground by being built up around rectangular and/or triangular basic shapes. Smaller brackets of angular widths in the interval of 10-15 degrees are advantageous in allowing two brackets to be placed next to each other within a corner of 60 degrees. For example two side panels or rails placed along two sides of a triangular floor panel with a 30 degree corner.

As the pillars have a circular cross sectional area and are cylindrical, the brackets can be placed equally well at any position around the pillars. Further, the cylindrical pillars simplify the building of the playground as no care has to be taken on how to orient the pillars when building. The pillars all have the same diameter for one series of brackets. This reduces the number of brackets needed to attach all playground elements to a pillar to a minimum and simplifies the construction of the playground correspondingly. In an embodiment the pillars have a uniform outer diameter of approximately 0.1 m. The pillars can have the same or different lengths without affecting the modularity of the playground. The pillar lengths only influence how high up above the ground the different playground elements can be placed.

Each of the brackets in the series of brackets comprises an element coupling portion corresponding to one of the elements in the series of elements. In this way the series of brackets comprises a floor panel bracket, a side panel bracket etc. Some or all of the brackets may comprise more than one element coupling portion so that the bracket may be adapted to be fastened to more playground elements optionally at the same time. A bracket may for example be adapted to fasten to both a side panel and floor panel or to either of them. The series of brackets comprises one or more brackets for each playground element in the series of playground elements.

All the brackets in the series of brackets comprise essentially identical pillar coupling portions such that all the brackets are adapted to be attached to the pillars in the same way. In other words the brackets all comprise similar pillar coupling portions with a curved contact face and a boring oriented so that the bracket can be attached to the pillar by a fastening member inserted into the bore of the bracket and into the pillar in a radial direction of the pillar. By identical pillar coupling portions is meant that the portion of each bracket comprises the same constructional elements defining the attachment, however details of no importance to the attachment such as e.g. colour, length of the boring etc. may be the same as well, or may vary.

Because the brackets are attached by means of fastening members oriented to-center and essentially perpendicularly to the contact face, the same brackets can be fastened equally well to solid pillars as well as to hollow pillars. This therefore increases the freedom of the playground construction while keeping the number of necessary components to a minimum.

The same pillar coupling interface for all the brackets in the series facilitates the same attachment regardless of the pillar material and whether it is solid or hollow, and regardless of which type or size of playground element is to be fastened. Further, the same tools can be used for the attachment of all the brackets which makes the mounting and building of the playground much more simple and fast, and reduces the risk of mistakes.

The attachment of the brackets from the bracket side is further advantageous in making is easier to attach the bracket while holding it in the desired position. This even more so, when more elements are to be attached close to each other on the same pillar, which is often the case.

The boring in the pillar coupling portion may be threaded to receive a correspondingly threaded fastening member and may comprise a contact face for a head of the fastening member.

The pillars of the playground may all be of the same material or of different materials. An advantage of the series of brackets according to the invention is that the same brackets can be used when building or modifying the playground regardless of the material of the pillars and regardless of the pillars are hollow or solid.

In an embodiment of the invention some or all of the pillars of the playground are solid pillars and the fastening member comprises screws. Hereby the brackets and thereby the playground elements can be fastened to the pillars without any preparation of the pillars as each bracket can be simple screwed directly into a pillar. This further makes it simple to enlarge or modify already existing playgrounds, as any new playground elements can be attached to the existing pillars simply by fastening the corresponding brackets where desired. In general, the pillars may optionally be predrilled before attaching the brackets.

As the brackets are attached by screws to the solid pillars, multiple brackets can be attached to the same pillar in a side by side relationship or at essentially the same height of the pillar facilitating the modularity of the playground. Further, the attachment of the brackets by means of screws is advantageous as the screw does not protrude from the pillar which is especially important on a playground where risk of any being injured in any way during play is to be minimized.

In an embodiment of the invention, some or all of the pillars of the playground are hollow pillars and the fastening member comprises bolts and nuts. The bolts are then simply fastened to the pillar wall. By the use of hollow pillars is obtained a more lightweight construction with the same or better strength properties. As mentioned above in relation to the use of solid pillars and screws, the attachment of the brackets to the hollow pillars by means of bolts likewise facilitate multiple brackets to be attached to the same pillar in a side by side relationship or at essentially the same height of the pillar. Hereby the playground can be partly or completely modular and can be constructed and built by a limited number of different types and sizes of playground elements which are then assembled as desired. Further, the attachment of the brackets by means of bolts fastened to the hollow pillars is also advantageous by avoiding any protruding parts. As mentioned above, this is especially important in the context of playgrounds where the safety of the users is a key issue.

In an embodiment, some or all of the pillars are made of wood, or a metal such as steel or aluminium. In an embodiment, some or all of the pillars are made of a composite material such as a plastic or carbon reinforced material. Hereby is obtained a strong but relatively light load carrying structure for the playground and a material with optimal weather resistance properties.

According to an embodiment of the invention, one or more of the brackets of the series of brackets comprises two pillar coupling portions arranged on the bracket such that the bracket is attached to the pillar by means of two fastening members inserted into the pillar at different heights and in two different radial directions. Hereby is obtained a stronger attachment of the bracket to the pillar, which may be especially advantageous when attaching for example larger floor panels or bars intended to carry higher loads. By placing the two pillar coupling portions at different heights and not directly below each other is obtained an increased torsional stiffness and strength of the connection while maintaining the to-center fastening of the fastening members. The placement of the two pillar coupling portions and the corresponding openings or bores into the pillar further reduces the strength of the pillar minimally and the risk of cracking the pillar in case of wooden pillars.

In an embodiment, the fastening member is inserted a distance into the pillar, the distance being smaller than the diameter of the pillar. As mentioned previously, this ensures the fastening member does not protrude in any way from the pillar which would otherwise impose a safety risk to the playground and a need for the protruding part to be removed, covered or otherwise shielded off.

According to a further embodiment of the invention, all the brackets of the series of brackets when attached to a pillar have an angular width of less than 90 degrees as measured from the center of the pillar and in a plane perpendicularly to the center axis of the pillar. As mentioned previously this advantageously facilitates the modularity of the playground by enabling more brackets and thereby playground elements to be placed side by side on the same height of the pillar.

In an embodiment of the playground, a bracket in the series of brackets further comprises a cover detachably mounted to the bracket such as to cover the fastening member when inserted into the pillar. The cover can be formed to cover any protruding parts of the bracket. Hereby the bracket is given a smooth outer surface without any protruding parts which is paramount to establish a satisfactory safety of the playground. Also, the cover hereby acts to reduce the risk of wear and rust on the load carrying parts of the bracket or the fastening member increasing the lifetime of the playground and its components.

The cover can be shaped to extend between the pillar and the playground element such as to shield off the pillar coupling portion and the element coupling portion of the bracket. Hereby the connection parts with any corners, protruding or extending parts are shielded off such that the risk of bruises and scratches is reduced. Also, the cover hereby provides a more smooth transition between the pillars and the different playground elements.

The cover can be detachably mounted to cover any protruding parts of the bracket and/or cover a gap between the bracket and the playground element. Hereby is ensured that shoe laces, clothing, fingers etc. of playing children cannot get caught in any gaps when moving around on the playground which is of the highest importance as well as a standard requirement to most playground equipment to avoid the risk of otherwise potentially severe accidents. Especially the closing off or removal of gaps is important since clothing etc. may get firmly caught and stuck in gaps so hard that a child cannot get free on its own.

In a further embodiment of the invention, the series of playground elements further includes a series of bars of predefined diameters, and/or a chain.

According to a further embodiment of the invention, the series of brackets comprises a bar bracket with an element coupling portion adapted to be fastened to an end of a cylindrical bar, and wherein the element coupling portion is oriented such that when the bar is fastened to a pillar by the bracket, then the bar extends in a radial direction of the pillar.

In a further embodiment, the series of brackets comprises a floor panel bracket with an element coupling portion adapted to be fastened to a corner portion of a floor panel, and wherein the element coupling portion is oriented such that when the floor panel is fastened to a pillar by the bracket, then the edges of the floor panel extends in a radial direction of the pillar.

According to a further embodiment of the invention, the series of brackets comprises a side panel bracket with an element coupling portion adapted to be fastened to a face of a side panel, and wherein the element coupling portion is oriented such that when the side panel is fastened to a pillar by the bracket, then the face of the side panel extends in a radial direction of the pillar.

By the above embodiments is obtained that the different types of playground elements are attached to-center of the pillars which facilitates the modularity of the playground and makes it easier to construct, modify of expand the playground in all directions. Further, the mounting of the playground elements to-center provides for and enables a full coupling and compatibility of elements to each other. For example, two floor panels can be attached side by side without any gaps between. This is very important in relation to the safety of using the playground, where there is a demand to ensure to the extent possible that a playing child cannot get for example a food, a finger, or a hood caught in gaps or openings which otherwise in the worst case could be potentially fatal.

By the attachment of the side panel such that the face of the side panel extends in the radial direction of the pillar is obtained, that the side panel can be attached alongside an edge of a floor panel, the edge of which is mounted to-center.

According to further embodiment of the invention, the fastening members are inserted into hollow pillars through T-shaped openings. In this way the nut on the bolt can be inserted into the interior of the pillar through the broader upper part of the T and the bolt then passed down into the more narrow body of the T where the bolt can then be tightened. The T-openings further provide for the same type of mounting when the bracket comprises two or more pillar coupling portions and are fastened with multiple bolts.

In another embodiment, the playground further comprises a number of pillars of a second circular cross sectional area and a second series of brackets wherein all the brackets in the second series of brackets all comprise the same pillar coupling portion with a contact face curved to lie against a side portion of the pillars of the second circular cross sectional area. In this way is obtained a playground with pillars of two different dimensions but which is still modular. Only here the two different diameters of the pillars then necessitates a further series of brackets with contact faces curved according to the diameter of the further pillars.

In a further embodiment, the playground further comprises a T-nut for the attachment of a side panel to a floor panel, the T-nut comprising an elongated flange and having a center of gravity closer to one end of the flange than to an opposite end of the flange. Because of the displacement of the center of gravity, the T-nut will automatically turn when inserted in a hole or groove of a component, to have the heavier part of the flange turning downward. When inserted into a horizontally or near-horizontally oriented groove, the T-nut will therefore automatically turn itself into an advantageous position with the flanges end portions behind the material of the component for the nut to be fastened up against. The component could for example be a rail oriented with the rail opening horizontally or near-horizontally. The T-nut hereby is extremely well suited for connecting components where the person assembling cannot visually inspect that the fastening nut is turned correctly into place. The quality of the playground assembly is thereby greatly improved.

The center of gravity of the T-nut being closer to one end of the flange than to the opposite end of the flange can be obtained by the T-nut having an asymmetrical cross sectional profile. This provides for a simply yet effective way of obtaining a T-nut which if possible will rotate into a specific position. The asymmetrical cross sectional profile may for example be obtained by cutting off, removing, or omitting a portion of one of the flange ends.

According to another aspect, the invention relates to a method of assembling a playground comprising a number of pillars of a circular cross sectional area, a series of playground elements including floor panels and side panels, and a series of brackets for attachment of the playground elements to the pillars, wherein all the brackets in the series of brackets comprise an element coupling portion adapted to be fastened to a playground element and a pillar coupling portion adapted to be fastened to a side portion of a pillar. The method comprises placing a number of pillars at predefined distances;
selecting a playground element from the series of playground elements;
selecting a bracket from the series of bracket, the bracket comprising an element coupling portion corresponding to the selected playground element;
fastening the selected bracket to a side portion of a pillar by inserting a fastening member into a boring of the bracket and into the pillar in a radial direction of the pillar
fastening the selected playground element to the element coupling portion of the selected bracket; and
subsequently mounting a detachable cover to the selected bracket such as to cover the fastening member.

The advantages of the proposed method are as mentioned in relation to the playground.

BRIEF DESCRIPTION OF THE DRAWINGS

In the following different embodiments of the invention will be described with reference to the drawings, wherein.

DETAILED DESCRIPTION

Figure 1:
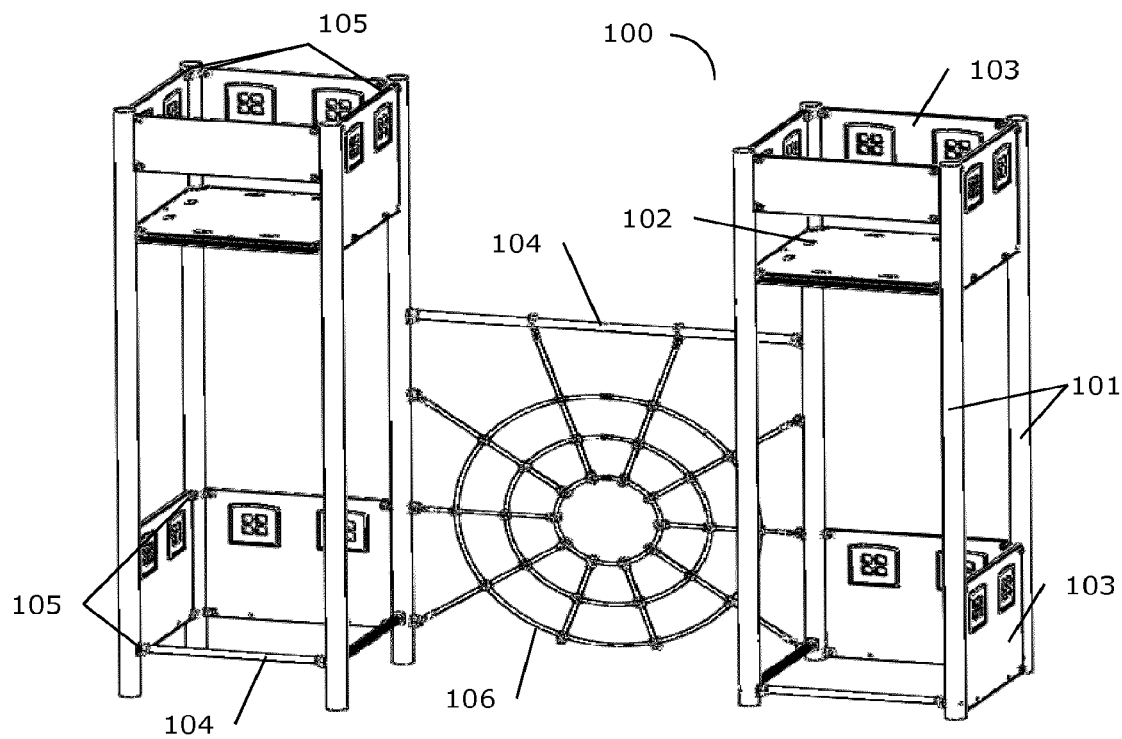
FIGS. 1 and 2 show sketches of playgrounds according to an embodiment of the invention.
Figure 2:
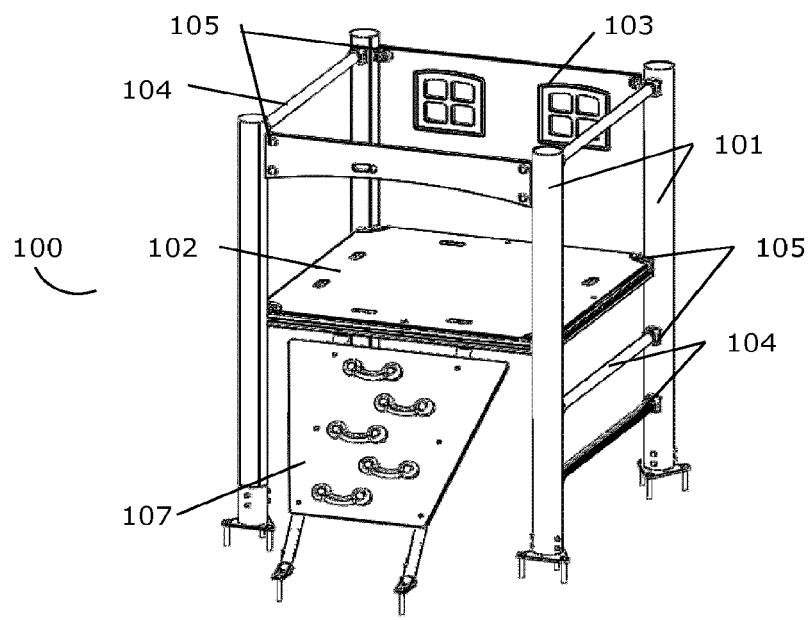

FIGS. 1 and 2 show two different playgrounds 100 according to embodiments of the invention and both built up from a modular system of pillars 101, different playground elements and brackets 105 for attaching the playground elements to the pillars 101. The playground elements in both FIGS. 1 and 2 include floor panels 102, side panels 103 of different shapes and decorations, and bars 104. The playground of FIG. 1 further comprises a net 106, and in FIG. 2 an angled panel with grips for climbing. Because of the modularity of the playgrounds only a reduced number of component are needed to build very different playground structures.

Figure 3:
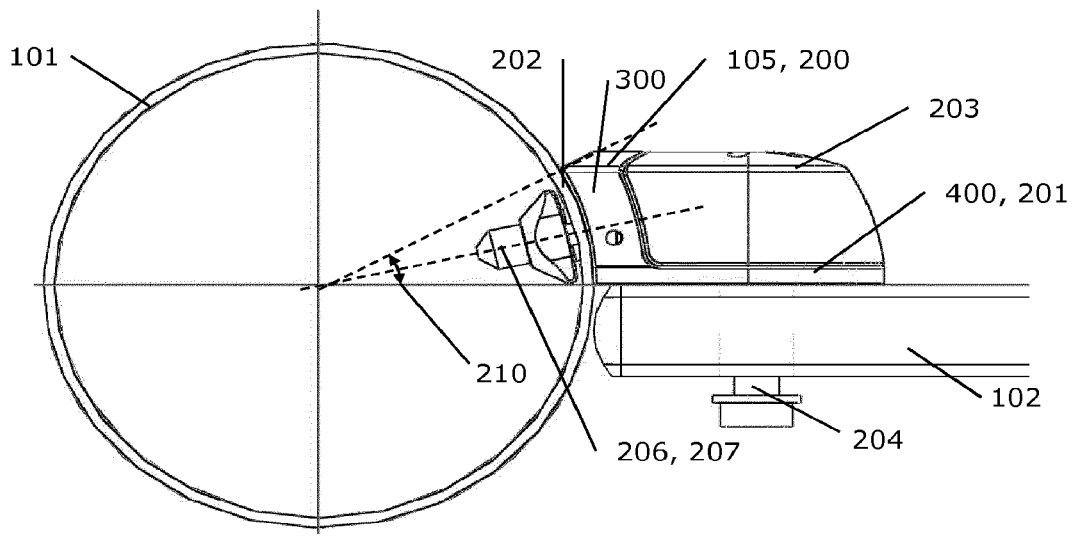
FIG. 3 shows an embodiment of a side panel bracket as attached to both a pillar and a side panel.
Figure 33:
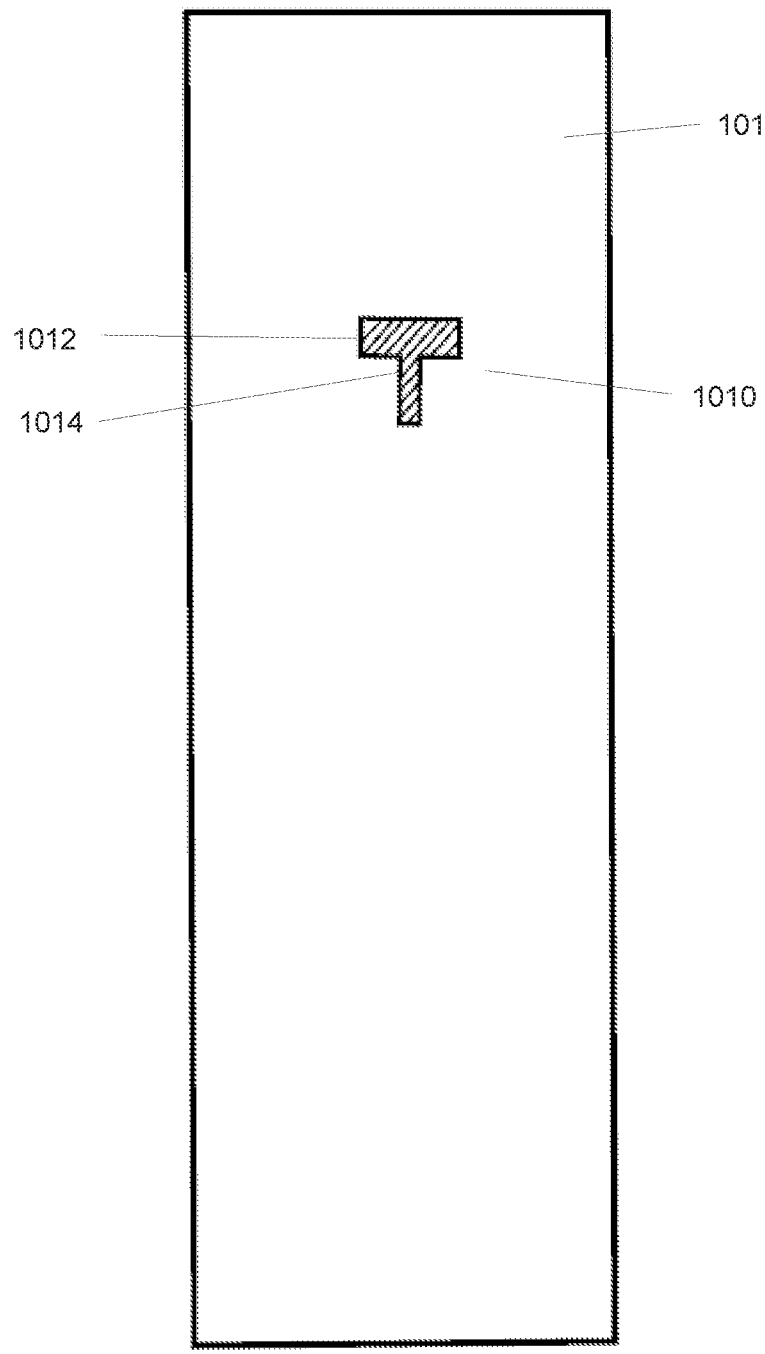
FIG. 33 shows an embodiment of a hollow pillar according to an embodiment as seen in a perspective view.

FIG. 3 shows an embodiment of a side panel bracket 200 as attached to both a pillar 101 and a side panel 102 as seen in a top view. The side panel bracket 200 is here attached to a hollow pillar 101 means of a bolt 206 but could equally well be attached to a solid pillar by means of a screw. An exemplary embodiment of pillar 101 is shown in FIG. 33, which illustrates a T-shaped opening 1010. In this way the nut on bolt 206 can be inserted into the interior of pillar 101 through a broader upper part 1012 of the T and bolt 206 then passed down into a more narrow body 1014 of the T where bolt 206 can then be tightened. The bracket 105, 200 comprises a pillar coupling portion 300 and an element coupling portion 400. The element coupling portion 400, 201 is for the side panel bracket 200 adapted to be fastened to the side panel 102, here by means of a tap or a bolt connection 204. The side panel bracket is in this embodiment adapted to be attached to a face of the side panel 102. The pillar coupling portion 300 is common for all the brackets in the series of brackets and comprises a contact face 202 curved to lie against the side portion of the pillar 101. The pillar coupling portion 300 further comprises a boring 205 (which can be seen in FIG. 2) for receiving a fastening member 206 fastened to the pillar 101. The boring is oriented as shown by the dashed line 207 in a direction approximately perpendicular to the curved contact face 202 and such that the fastening member 206 is mounted to-center in a radial direction of the pillar. The side panel bracket 200 in this embodiment extends an angular width 210 of approximately 12-14 degrees. This allows for two side brackets to be placed side by side within an angle of 60 degrees for attaching two side panels as sides to a floor panel with a 60 degree corner. The side panel bracket 200 comprises a cover 203.

Figure 4:
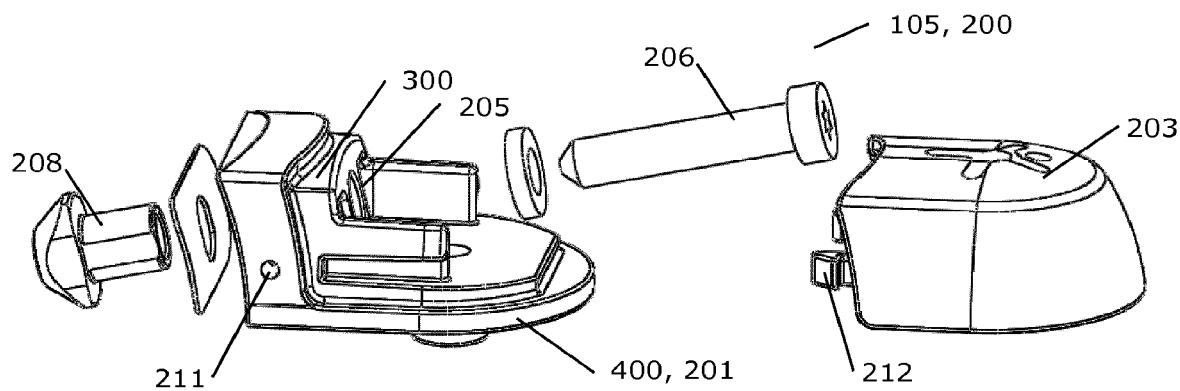
FIGS. 4-5 show an embodiment of a side panel bracket in different perspective and exploded views.
Figure 5:
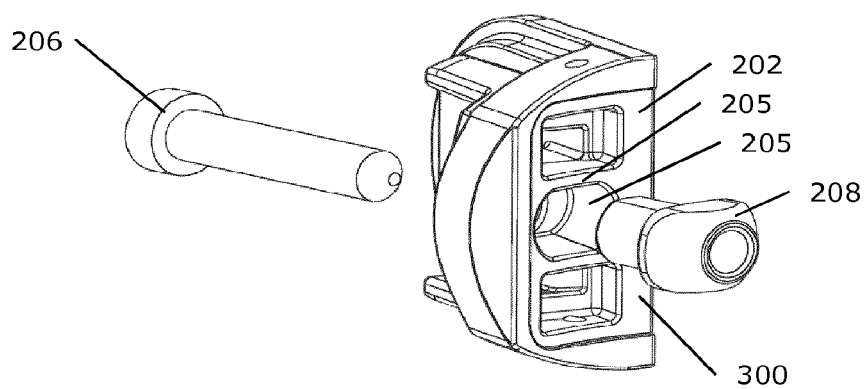

FIGS. 4 and 5 show in an exploded view an embodiment of a side panel bracket 200 with the same components as described in relation to FIG. 3 and as seen in two different perspective views as seen from above and from the side of the pillar, respectively. Here, the pillar coupling portion 300 can be seen in more detail with the boring 205 for receiving a bolt 206 or a screw and with the curved contact face 202. The faces on the nut 208 provides together with the corresponding faces 209 in the boring 205 for the bolt and nut connection to be self-tightening when the bolt is tightened from the outside. The small holes 211 are used if the cover 203 is to be removed by bending the hook 212 on the cover 203.

Figure 23:
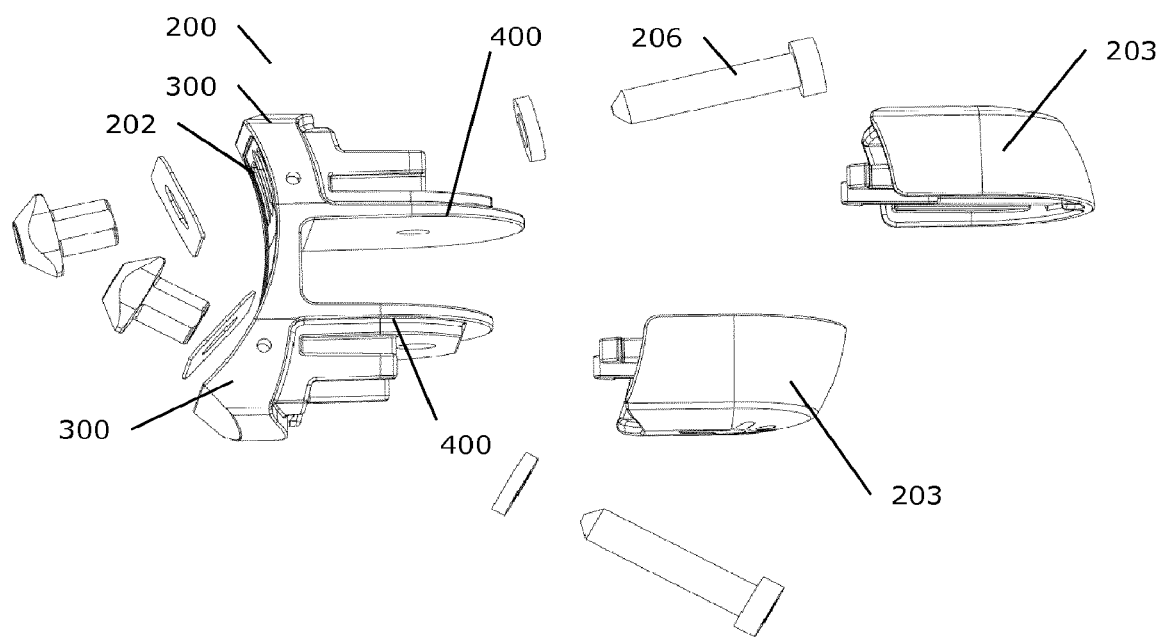
FIGS. 23 and 24 show an embodiment of a side panel bracket in an exploded view and as seen from above as attached to a side panel and a pillar, respectively.
Figure 24:
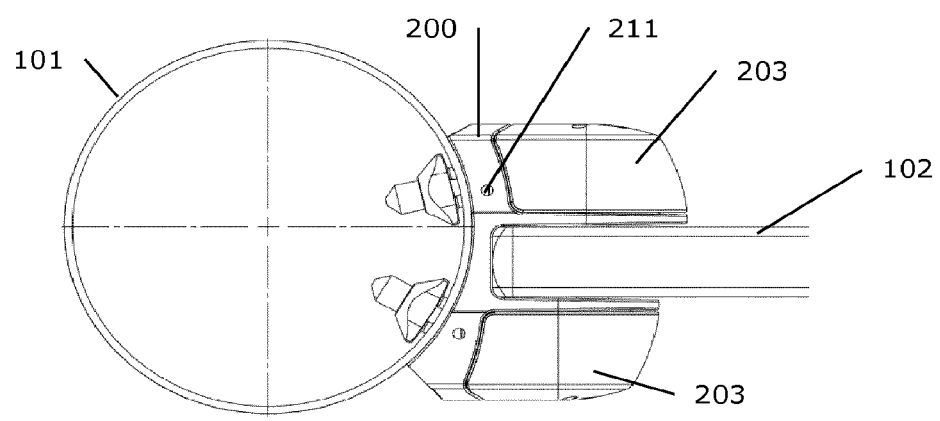

Another embodiment of a side panel bracket 200 is shown in the FIGS. 23 and 24. This side panel bracket is configured for attachment to both sides of a side panel 102 and therefore comprises two panel coupling portions 400. The bracket is shown in an exploded view in FIG. 23 and as seen from above when attached to a side panel 102 and a pillar 101. This side panel bracket 200 comprises two pillar coupling portions 300 for a stronger connection to the pillar. All protruding parts of the bracket 200 and the fastening members 206 are shielded off and covered by the covers 203 each extending between the pillar and the side panel.

Figure 6:
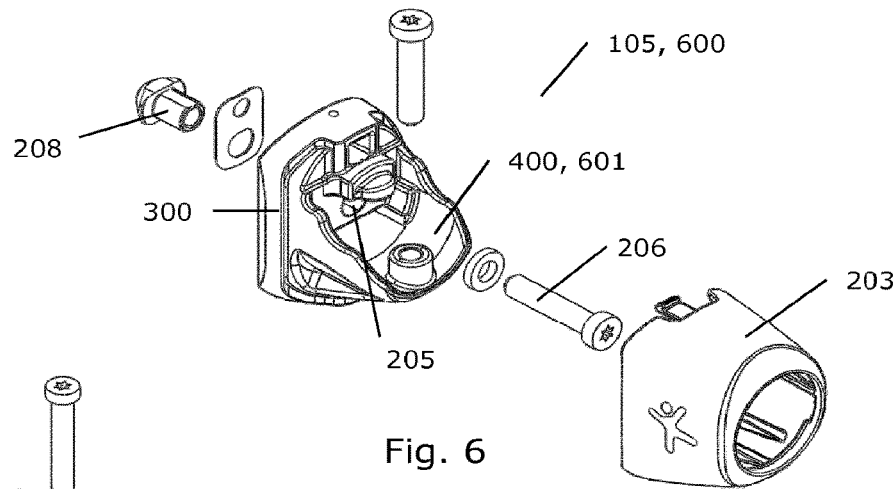
FIGS. 6-8 show two embodiments of a bar bracket in different perspective and exploded views, in isolation and as attached to a playground element.
Figure 7:
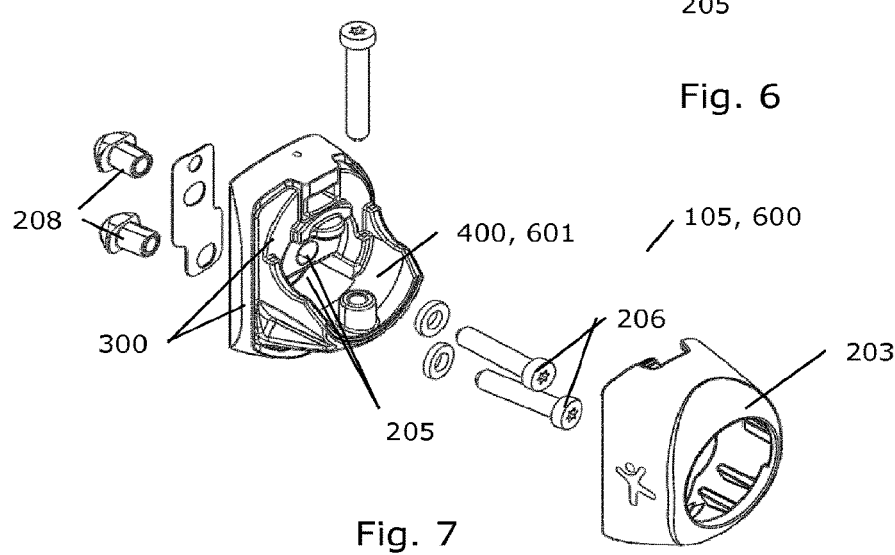
Figure 8:
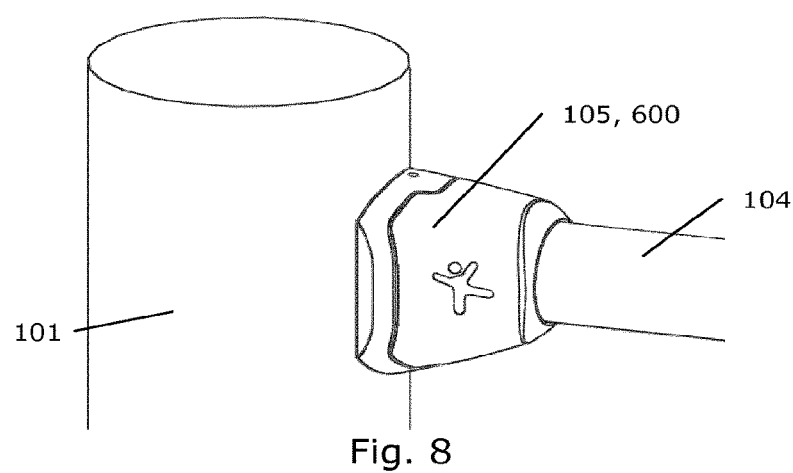

FIGS. 6 and 7 show two different embodiments of a bar bracket 105, 600 in an exploded view. In FIG. 8 is shown a bar bracket attaching a bar 104 to a pillar 101. The bar bracket 105, 600 shown in FIG. 6 is configured for the fastening of a bar 104 of a smaller diameter which in this embodiment is of 38 mm in diameter, whereas the bar bracket in FIG. 7 is configured for the fastening of a bar 104 of a larger diameter which in this embodiment is of 48 mm in diameter.

The bar bracket 600 in FIG. 6 comprises one pillar coupling portion 300 including a curved contact face and a boring for the fastening member 206, whereas the bar bracket shown in FIG. 7 comprises two pillar coupling portions 300 and thus are constructed to be attached to the pillar 101 by means of two fastening members 206. The bar coupling portion 400, 601 of both bar brackets is in these embodiments the same except for the dimensions corresponding to the two different diameters of the bars 104. In FIG. 8 is shown the attachment of a bar 104 to a pillar 101 by means of a bar bracket 600 as shown in FIGS. 6 and 7.

Figure 9:
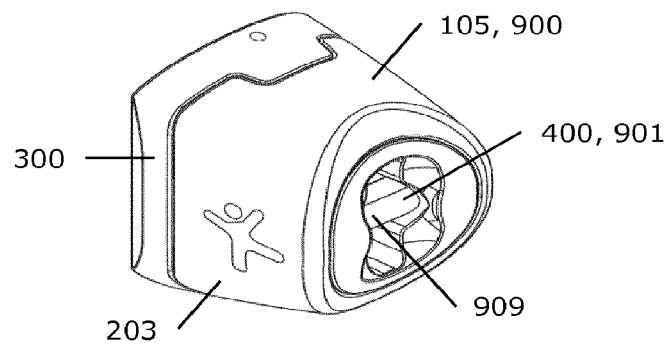
FIGS. 9-11 show an embodiment of a chain bracket in different perspective views, in isolation and as attached to a chain and a pillar.
Figure 10:
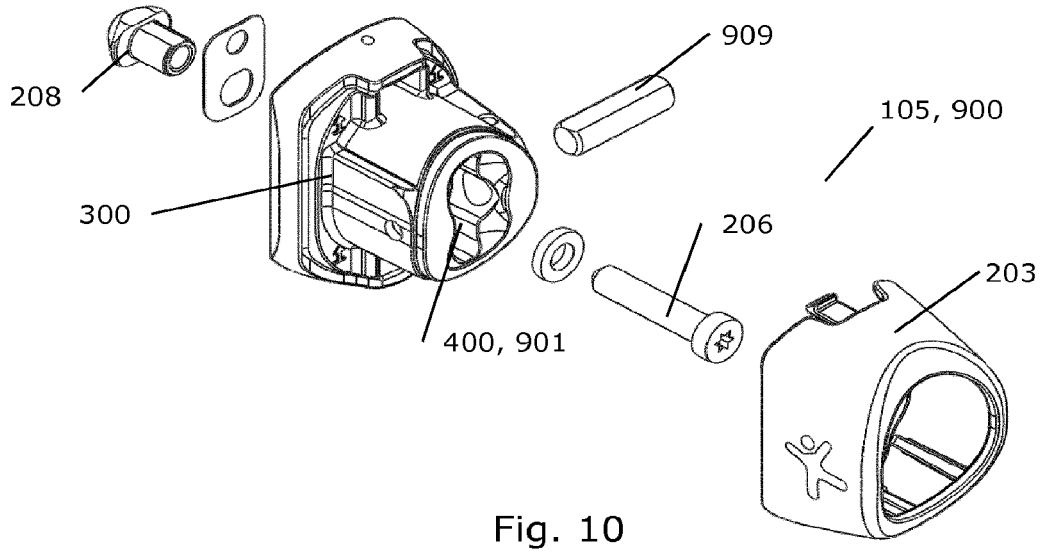
Figure 11:
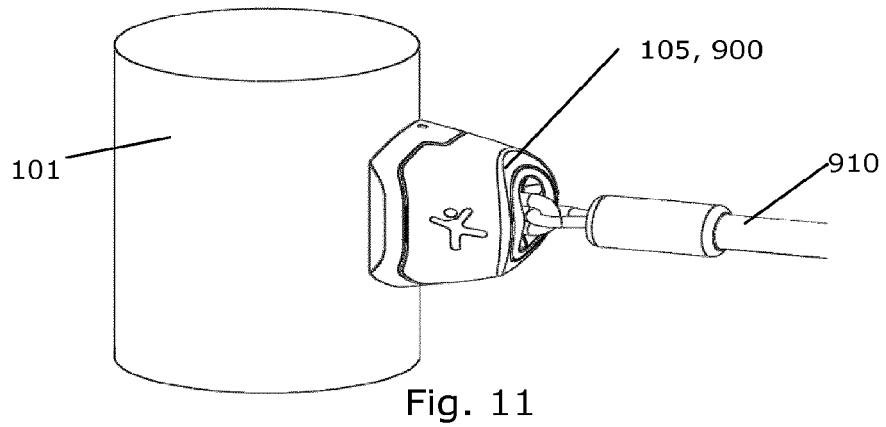
Figure 12:
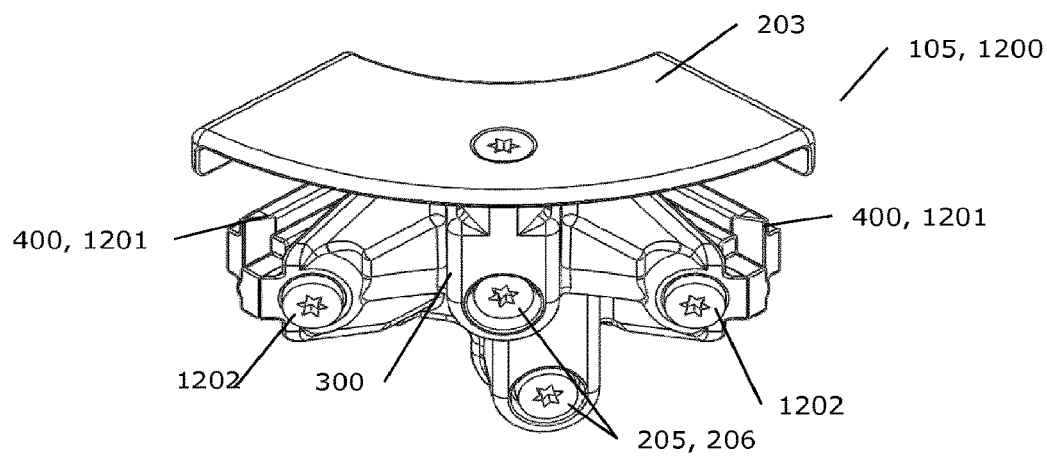
FIGS. 12-22 show embodiments of different floor panel brackets in the series of brackets according to the invention in different views, in isolation and as attached to a floor panel.
Figure 13:
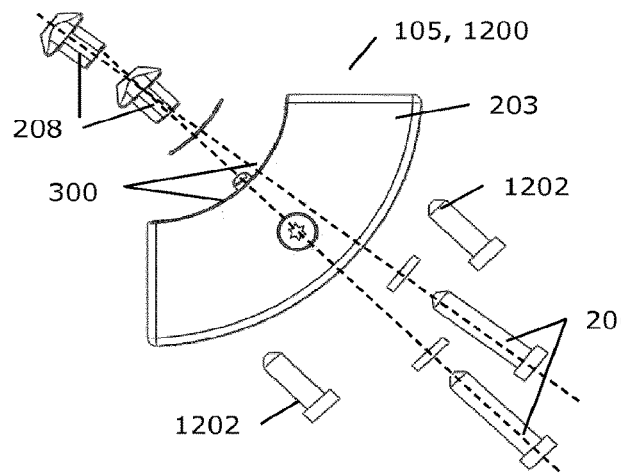
Figure 14:
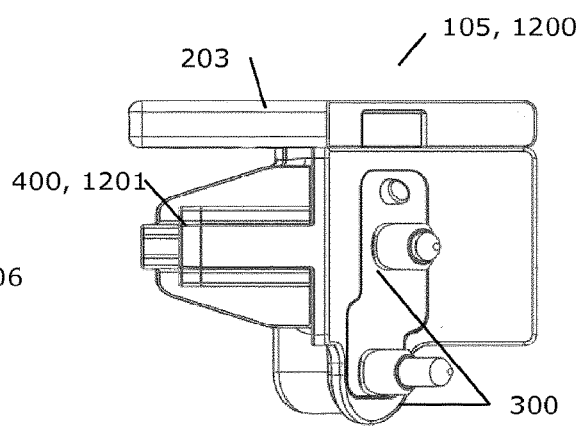
Figure 15:
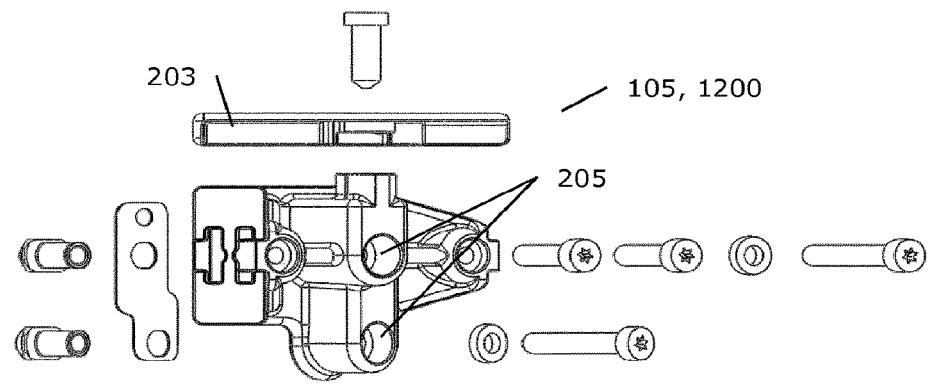

FIGS. 9-11 show an embodiment of a chain bracket 900 as assembled, in an exploded view, and as fastening a chain 910 to a pillar 101, respectively. The chain bracket 900 comprises a pillar coupling portion 300 similar to the other brackets 105 in the series of brackets, and comprising a curved contact face adapted to lie against the pillar and a boring oriented for the fastening member 206 to be oriented in a radial direction of the pillar 101. The chain bracket 900 further comprises an element coupling portion 400, 901 which is specially adapted to fasten to the chain 910. In this embodiment this is done by a transversely oriented pin 909 placed to go through an eye in the end of the chain 910.

Figure 16:
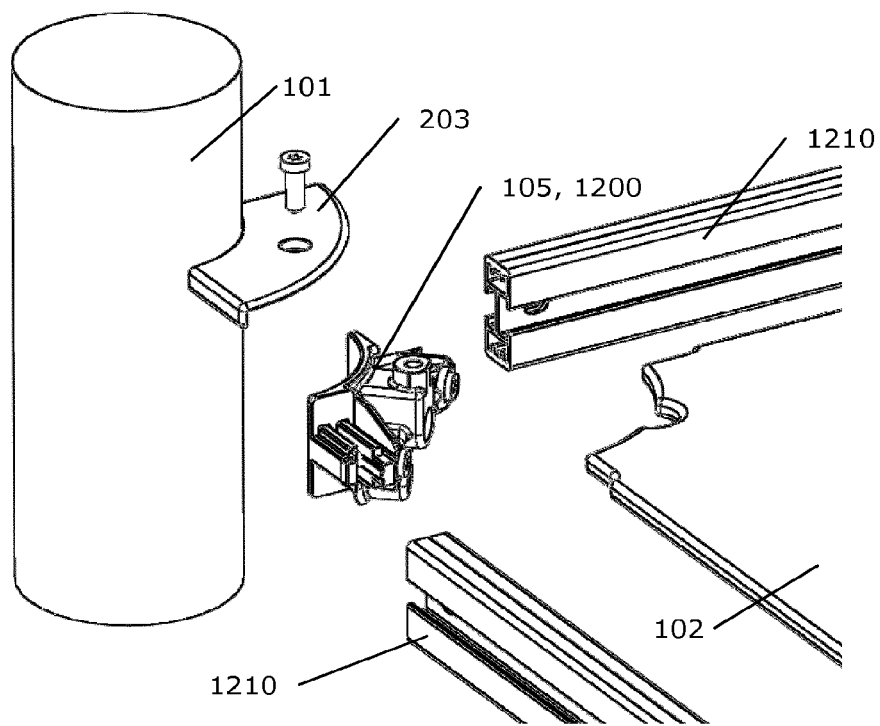
Figure 17:
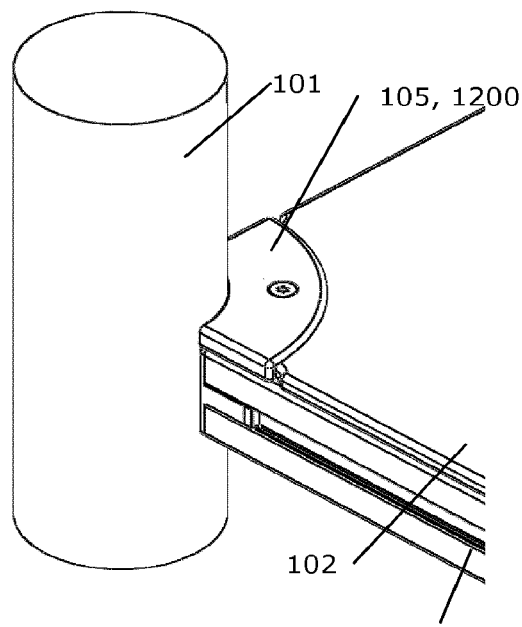
Figure 18:
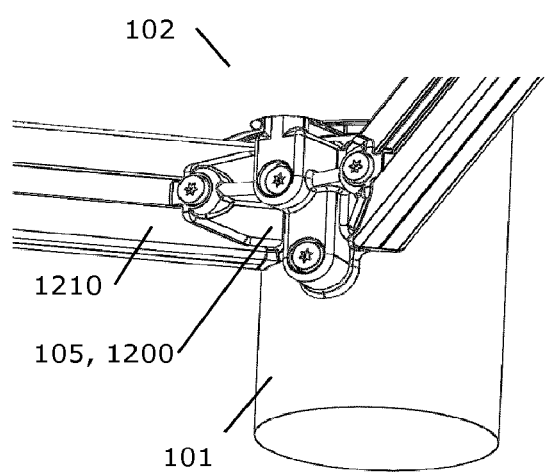
Figure 19:
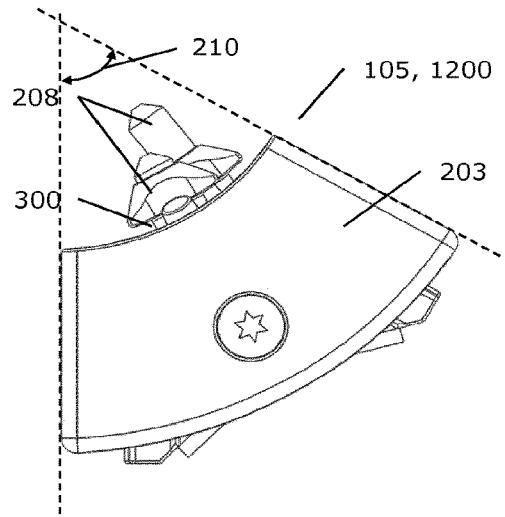
Figure 20:
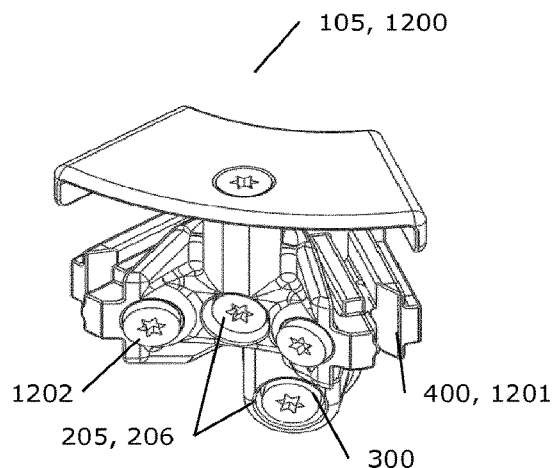
Figure 21:
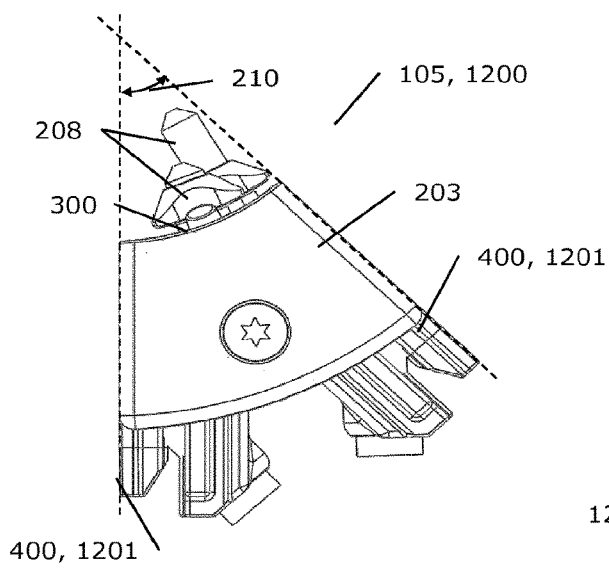
Figure 22:
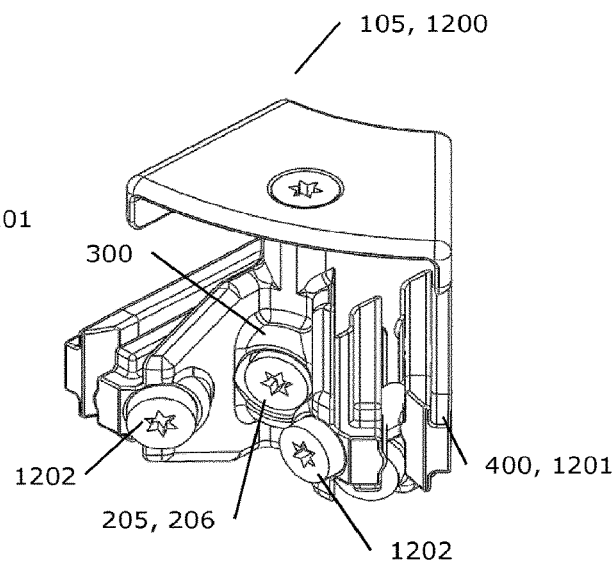

FIGS. 12-22 show different embodiments of floor panel brackets 1200 in the series of brackets according to the invention, where the brackets are shown in perspective and exploded views from different angles. In FIGS. 16, 17, 18 is shown a floor panel 102 as attached to a pillar 101 by means of a floor panel bracket as shown alone in the FIGS. 12-15. The connection is here shown in an exploded view (FIG. 16), and as seen from above and below, respectively (FIGS. 17 and 18, respectively). The floor panel brackets shown in the FIGS. 12-18 is for attaching a 90 degrees corner of a floor panel to a pillar. In FIGS. 19-20 and 21-22 are shown similar floor panel brackets but for the connection of a 60 degrees corner and a 45 degrees corner of a floor panel, respectively.

The floor panel bracket 1200 like the other brackets 105 in the series of brackets comprises a pillar coupling portion 300 or interface where the bracket is attached to the pillar 101. The 90 degrees floor panel bracket of FIGS. 12-18 comprises two such pillar coupling portions 300 to provide a stronger connection. The two fastening members 206 as well as the corresponding bores 205 are all oriented to-center, but are placed in a displaced relationship at different heights and at different radial positions. This may best be viewed in the top view of FIG. 13 where the orientation of the fastening members 206 and the bores 205 are outlined by the dashed lines. The floor panel bracket 1200 further comprises an element coupling portion 1201 adapted to attach to the floor panel 102. One or more of the edges of the floor panel 102 may further be covered by rails 1210 in case the floor panel is not mounted in abutment to another floor panel. The floor panel 102 and the rails 1210 are attached to the floor panel bracket by a set of bolts or screws 1202.

The floor panel brackets may be made in different angular width 210 such as corresponding to 45, 60, and 90 degrees corners of a floor panel. FIGS. 19-20 and 21-22 show floor panel brackets 1200 of angular widths 210 of 60 degrees and 45 degrees, respectively. These floor panel brackets comprise the same components and are attached in the same manner as the floor panel bracket of FIGS. 12-19. Only both these brackets comprise only one pillar coupling portion 300 each mainly because of the more restricted space available.

Figure 25:
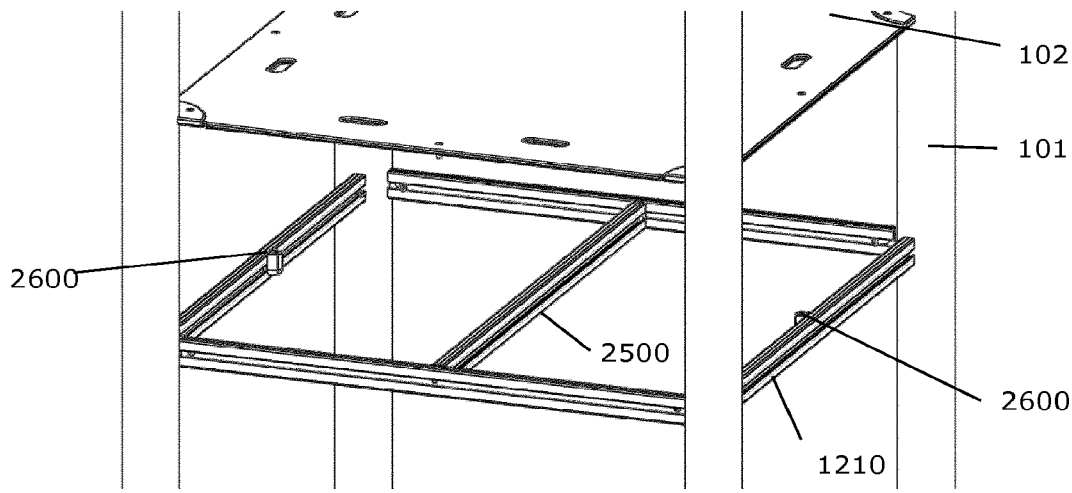
FIG. 25 illustrates the attachment of a floor panel to a number of pillars.
Figure 26:
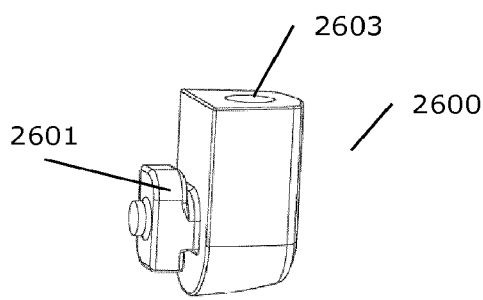
FIGS. 26-29 show two embodiments of connectors for one-sided fastening of a floor panel to side rails and in different perspective views.
Figure 27:
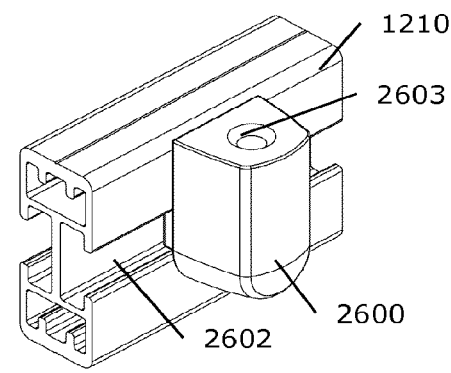
Figure 28:
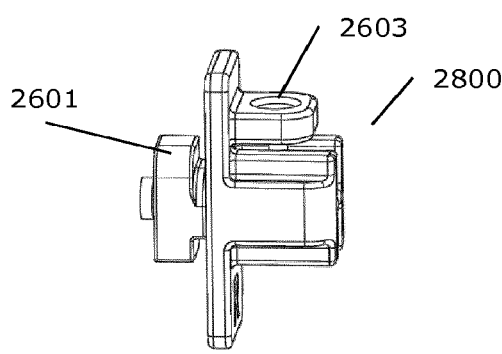
Figure 29:
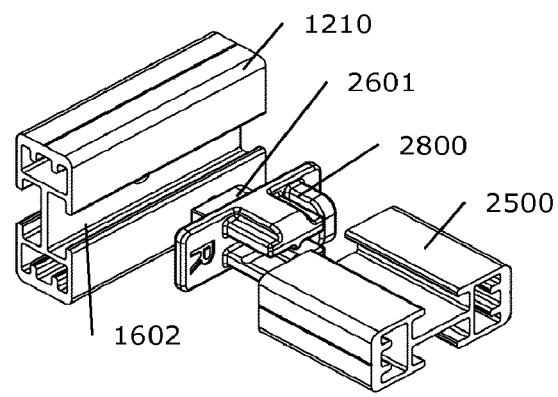

FIG. 25 illustrates the attachment of a floor panel 102 to a number of pillars 101, A number of side rails 1210 are set up in between the pillars by means of floor panel brackets (not shown). Cross rails 2500 may be used in between the side rails for larger floor panels or to provide further stiffness to the floor panels in general. The floor panel 102 is then placed on top of the rails 1210, 2500 and brackets, resting on the rails. The floor panel is attached to the brackets by means of the covers 203 (not shown) in each corner also closing off any gaps between the floor panel and the pillars or the brackets. Further, the floor panel 102 is attached to the side rails 1210 by means of side rail connectors 2600 which are shown in more details in FIGS. 26 and 27. The cross rail 2500 is attached to the side rails 2600 by means of a cross rail connector 2800 which is shown in more details in FIGS. 28 and 29.

Both the side rail connector 2600 and the cross rail connector 2800 comprise a flange portion 2601 of an elongated shape and configured for insertion into the rail groove 2602. The connectors further comprises a threaded boring 2603. When inserted into a side rail 2600, the connector is then turned approximately 90 degrees to hereby provide for attachment of the cross rail 2500 or the floor panel 102 by means of a screw or a bolt inserted into the boring 2603. The connectors in this way provides for a one-sided fastening of the floor panel or a cross rail to the side rails.

Figure 30:
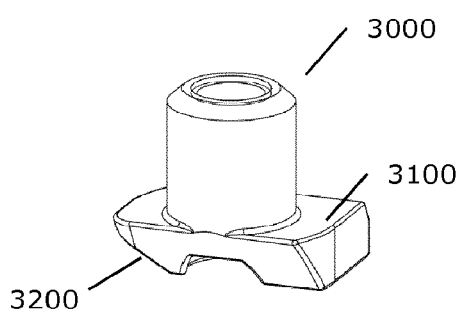
FIGS. 30-32 show an embodiment of a T-nut according to an embodiment of the invention as seen in a perspective view, a cross-sectional view and from all sides, respectively.
Figure 31:
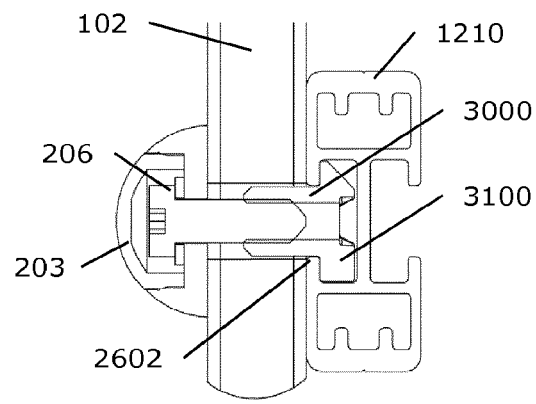
Figure 32:
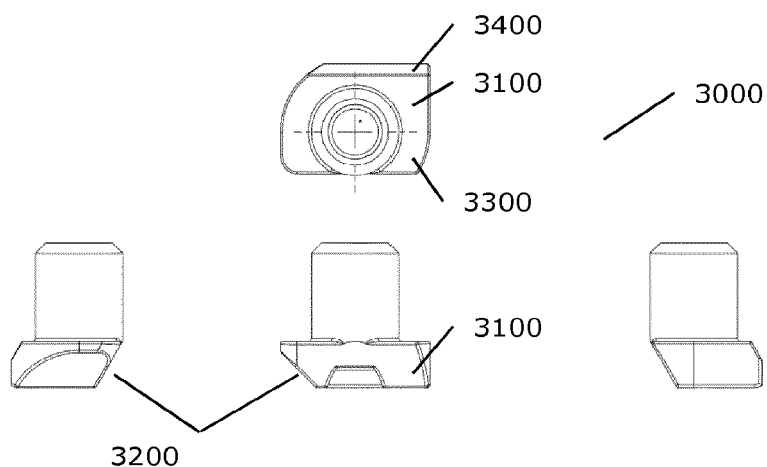

FIGS. 30-32 show an embodiment of a T-nut 3000 according to an embodiment of the invention as seen in a perspective view, a cross-sectional view, and from all sides, respectively.

The T-nut 3000 is advantageous for the attachment of a side panel 102 to a side rail 1210 thereby connecting the side panel to the floor panel. The T-nut comprises an elongated flange 3100 configured and sized for inserting into the groove 2602 of a side rail 1210. The T-nut 3000 is shown in a perspective view in FIG. 30 and from all sides, i.e. from the top and three sides in FIG. 32. In FIG. 31 is shown in a cross sectional view a T-nut 3000 and a mating bolt 106 connecting a side 1210 and a side panel 102.

S best seen in FIGS. 30 and 32, the T-nut comprises an elongated flange 3100 with an asymmetrical cross sectional profile. Thereby the center of gravity for the T-nut is closer to one end of the flange than to the opposite end of the flange, or in other words the T-nut is heavier near one end of the flange that the other. This is obtained by the cut-off portion 3200 of one end of the flange. When the T-nut is inserted into the groove 2602 of the rail 1210, the T-nut then automatically turn. In this way the flanges are automatically positioned ready for tightening.

Also, two corners 3300 of the flange 3100 may be rounded to aid in the rotation of the T-nut. Also, one corner 3400 of the flange 3100 may be shaped more sharply to aid in stopping the rotation of the T-nut.

The special shape of the T-nut ensures that the T-nut is always correctly positioned in the rail without the assembler having to actively turn the nut. The T-nut can then be correctly positioned even when the assembler cannot easily see or inspect the other side of the assembly as is often the case when relatively large side panels are handled and mounted to other parts. The quality of the playground assembly is thereby greatly improved.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A playground comprising a plurality of pillars having a circular cross sectional area, a series of playground elements including floor panels and side panels, and a series of brackets for attachment of the playground elements to the pillars, wherein all the brackets in the series of brackets comprise an element coupling portion configured to be fastened to a playground element and a pillar coupling portion configured to be fastened to a side portion of a pillar, the pillar coupling portion comprising a contact face curved to lie against the side portion of the pillar and a boring for receiving a fastening member to be inserted a distance into the pillar, the boring being oriented in a direction approximately perpendicular to the curved contact face such that the bracket when fastened to the pillar is attached by the fastening member inserted from the bracket and into the pillar in a radial direction of the pillar, wherein the series of brackets comprises brackets with element coupling portions configured to be fastened to each of the playground elements in the series of playground elements, wherein all the brackets in the series of brackets comprise substantially identical pillar coupling portions such that all the brackets are configured to be attached to the pillars in the same way, wherein the pillars comprise hollow pillars which include a T-shaped opening on a face of the pillar, each of the T-shaped openings comprising an upper part on the face of the pillar and a lower body on the face of the pillar, the lower body being more narrow than the upper part, the fastening members comprise bolts and nuts, and wherein the fastening members are inserted into the hollow pillars through the T-shaped openings in the hollow pillars.

2. The playground according to claim 1, wherein a bracket in the series of brackets further comprises a cover detachably mounted to the bracket.

3. The playground according to claim 2, wherein the cover is shaped to extend between the pillar and the playground element.

4. The playground according to claim 2, wherein the cover is detachably mounted to cover any protruding parts of the bracket and/or cover a gap between the bracket and the playground element.

5. The playground according to claim 1, wherein the pillars are made of wood or a metal.

6. The playground according to claim 1, wherein the pillars are made of a composite material.

7. The playground according to claim 1, wherein one or more of the brackets of the series of brackets comprises two pillar coupling portions arranged on the bracket such that the bracket is attached to the pillar by two fastening members inserted into the pillar at different heights and in two different radial directions.

8. The playground according to claim 1, wherein the fastening member is inserted a distance into the pillar, the distance being smaller than the diameter of the pillar.

9. The playground according to claim 1, wherein all the brackets of the series of brackets when attached to a pillar have an angular width of less than 90 degrees as measured from the center of the pillar and in a plane perpendicular to the center axis of the pillar.

10. The playground according to claim 1, wherein the series of playground elements further comprises a series of bars of predefined diameters.

11. The playground according to claim 10, wherein the series of brackets comprises a bar bracket with an element coupling portion configured to be fastened to an end of a cylindrical bar, and wherein the element coupling portion is oriented such that when the bar is fastened to a pillar by the bracket, then the bar extends in a radial direction of the pillar.

12. The playground according to claim 1, wherein the series of playground elements further comprises a chain.

13. The playground according to claim 1, wherein the series of brackets comprises a side panel bracket with an element coupling portion configured to be fastened to a face of a side panel, and wherein the element coupling portion is oriented such that when the side panel is fastened to a pillar by the bracket, then the face of the side panel extends in a radial direction of the pillar.

14. The playground according to claim 1, wherein the series of brackets comprises a floor panel bracket with an element coupling portion configured to be fastened to a corner portion of a floor panel, and wherein the element coupling portion is oriented such that when the floor panel is fastened to a pillar by the bracket, then the edges of the floor panel extends in a radial direction of the pillar.

15. The playground according to claim 1, further comprising a plurality of pillars of a second circular cross sectional area and a second series of brackets wherein all the brackets in the second series of brackets comprise the same pillar coupling portion with a contact face curved to lie against a side portion of the pillars of the second circular cross sectional area.

16. The playground according to claim 1, further comprising a T-nut for the attachment of a side panel to a floor panel, the T-nut comprising an elongated flange and having a center of gravity closer to one end of the flange than to an opposite end of the flange.

17. The playground according to claim 16, wherein the flange of the T-nut has an asymmetrical cross sectional profile.

18. The playground according to claim 1, wherein the boring in the bracket and the fastening members are arranged such that faces on the nut provide together with corresponding faces in the boring for the bolt and nut connection to be self-tightening when the bolt is tightened from the outside.

19. A method of assembling a playground comprising a plurality of pillars of a circular cross sectional area, a series of playground elements including floor panels and side panels, and a series of brackets for attachment of the playground elements to the pillars, wherein all the brackets in the series of brackets comprise an element coupling portion configured to be fastened to a playground element and a pillar coupling portion configured to be fastened to a side portion of a pillar, the method comprising:
   placing a plurality of pillars at predefined distances;
   selecting a playground element from the series of playground elements;
   selecting a bracket from the series of brackets, the bracket comprising an element coupling portion corresponding to the selected playground element:
   fastening the selected bracket to a side portion of a pillar by inserting a fastening member into a boring of the bracket and into the pillar in a radial direction of the pillar;
   fastening the selected playground element to the element coupling portion of the selected bracket; and
   subsequently mounting a detachable cover to the selected bracket;
   wherein the pillars comprise hollow pillars which include a T-shaped opening on a face of the pillar, each of the T-shaped openings comprising an upper part on the face of the pillar and a lower body on the face of the pillar, the lower body being more narrow than the upper part, the fastening members comprise bolts and nuts, and wherein the fastening members are inserted into the hollow pillars through the T-shaped openings in the hollow pillars.

* * * * *